(12) United States Patent
Liu et al.

(10) Patent No.: US 11,137,998 B2
(45) Date of Patent: Oct. 5, 2021

(54) DEPENDENCY LOCK IN CICD PIPELINES

(71) Applicant: eBay Inc., San Jose, CA (US)

(72) Inventors: Naitian Liu, Sunnyvale, CA (US); Gaoxin Dai, Sunnyvale, CA (US); Yan Liu, San Jose, CA (US); Liyong Cheng, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/153,982

(22) Filed: Oct. 8, 2018

(65) Prior Publication Data

US 2020/0110598 A1 Apr. 9, 2020

(51) Int. Cl.
G06F 8/71 (2018.01)
G06F 21/31 (2013.01)
G06F 8/60 (2018.01)

(52) U.S. Cl.
CPC .............. *G06F 8/71* (2013.01); *G06F 8/60* (2013.01); *G06F 21/31* (2013.01)

(58) Field of Classification Search
CPC ..... G06F 8/71; G06F 8/60; G06F 8/70; G06F 8/20; G06F 21/31
USPC .................................................. 717/170–171
See application file for complete search history.

(56) References Cited

U.S. PATENT DOCUMENTS

| 6,223,343 | B1 * | 4/2001 | Hopwood | G06F 8/71 |
| | | | | 707/999.202 |
| 8,037,453 | B1 * | 10/2011 | Zawadzki | G06F 11/368 |
| | | | | 717/107 |
| 8,677,315 | B1 * | 3/2014 | Anderson | G06F 8/60 |
| | | | | 717/101 |
| 9,454,351 | B2 | 9/2016 | Anderson et al. | |
| 9,760,366 | B2 | 9/2017 | Frank et al. | |
| 2004/0107415 | A1 * | 6/2004 | Melamed | G06F 11/3684 |
| | | | | 717/124 |

(Continued)

FOREIGN PATENT DOCUMENTS

| WO | 2017/201475 A1 | 11/2017 |
| WO | 2020/076382 A1 | 4/2020 |

OTHER PUBLICATIONS

Nicolette, "Build a CI/CD Pipeline in the Cloud: Part Two", Retrieved from the Internet URL : <https://www.leadingagile.com/2018/06/build-a-ci-cd-pipeline-in-the-cloud-part-two/>, Jun. 5, 2018, 15 pages.

(Continued)

*Primary Examiner* — Wei Y Zhen
*Assistant Examiner* — Brahim Bourzik
(74) *Attorney, Agent, or Firm* — FIG. 1 Patents

(57) ABSTRACT

Deployment of a modified service affects the functioning of other services that make use of the service. To address the problems that deployment of modified executable code can cause in other services, a dependency lock is placed on candidate code to prevent deployment until tests on the client services are successfully completed. Developers of client services that rely on a supplier service are enabled to place a dependency lock on the service. As a result, deployment of the supplier service is only allowed when tests of the client services complete successfully. The administrator of the service being deployed may control which other users are able to add dependency locks without giving those users other permissions such as the ability to modify the source code of the service, the ability to deploy the service, and the like.

20 Claims, 12 Drawing Sheets

(56) References Cited

U.S. PATENT DOCUMENTS

| | | | |
|---|---|---|---|
| 2005/0114829 A1* | 5/2005 | Robin | G06Q 10/06 |
| | | | 717/101 |
| 2006/0101443 A1* | 5/2006 | Nasr | G06F 8/71 |
| | | | 717/163 |
| 2009/0282042 A1* | 11/2009 | Russell | G06F 8/71 |
| 2014/0189641 A1 | 7/2014 | Anderson et al. | |
| 2014/0250419 A1* | 9/2014 | Ivmark | G06F 8/20 |
| | | | 717/101 |
| 2016/0077809 A1 | 3/2016 | Heyhoe et al. | |
| 2016/0124742 A1* | 5/2016 | Rangasamy | H04L 47/70 |
| | | | 717/103 |
| 2017/0255460 A1 | 9/2017 | Frank et al. | |
| 2018/0129497 A1 | 5/2018 | Biddle et al. | |
| 2020/0201831 A1* | 6/2020 | Shekhawat | G06F 8/71 |
| 2021/0124576 A1* | 4/2021 | Gungabeesoon | G06F 8/60 |

OTHER PUBLICATIONS

International Search Report received for PCT Application No. PCT/US2019/040452, dated Oct. 31, 2019, 3 pages.
International Written Opinion received for PCT Application No. PCT/US2019/040452, dated Oct. 31, 2019, 7 pages.
Spinnaker: "Managing Pipelines", Retrieved from the Internet URL: <https://spinnaker.io/guides/user/pipeline/managing-pipelines/>, May 31, 2018, 13 pages.
Spinnaker: "Pipeline Permissions", Retrieved from the Internet URL: <URL:http:s//www.spinnaker.io/setup/security/authorization/pipeline-permissions/>, May 31, 2018, 3 pages.

* cited by examiner

PERMISSIONS TABLE 310

| ACCOUNT ID | EASYDNS API | EASYDNS BACKEND | EASYDNS DASHBOARD |
|---|---|---|---|
| 1001 | EDIT, DEPLOY, LOCK | LOCK | NONE |
| 1002 | LOCK | EDIT, DEPLOY, LOCK | LOCK |
| 1003 | LOCK | NONE | EDIT, DEPLOY, LOCK |
| 1004 | LOCK | EDIT, LOCK | EDIT, DEPLOY, LOCK |

DEPENDENCY LOCK TABLE 350

| SUPPLIER SERVICE | SUPPLIER STAGE | CLIENT SERVICE | CLIENT STAGE |
|---|---|---|---|
| EASYDNS API | DEPLOY TO PRODUCTION | EASYDNS BACKEND | INTEGRATION TEST |
| EASYDNS API | DEPLOY TO PRODUCTION | EASYDNS DASHBOARD | INTEGRATION TEST |
| EASYDNS BACKEND | DEPLOY TO PRODUCTION | EASYDNS API | UNIT TEST |

*FIG. 3*

DEPENDENCY LOCK IN CICD PIPELINES

TECHNICAL FIELD

The subject matter disclosed herein generally relates to continuous integration and delivery (CICD) pipelines. Specifically, in some example embodiments, the present disclosure addresses systems and methods, including user interfaces, for creating one or more dependency locks in a CICD pipeline.

BACKGROUND

Continuous integration (CI) is a development practice that requires developers to integrate code into a shared repository several times a day. Each check-in is then verified by an automated build, allowing teams to detect problems early. By integrating regularly, developers can detect errors quickly, and locate them more easily.

Continuous delivery (CD) is a software development practice where code changes are automatically built, tested, and prepared for a release to production. CD expands upon continuous integration by deploying all code changes to a testing environment and/or a production environment after the build stage. When continuous delivery is implemented properly, developers will always have a deployment-ready build artifact that has passed through a standardized test process.

CICD pipelines allow software to be deployed incrementally, as features are added and bugs are fixed, rather than with set release dates. Typically, code changes on a project are committed, the updated code is deployed to a quality assurance (QA) server, one or more tests for the project are run on the QA server, and the code is released to a production server if the tests for the project are passed.

BRIEF DESCRIPTION OF THE DRAWINGS

Some embodiments are illustrated by way of example and not limitation in the figures of the accompanying drawings.

FIG. 3 is a block diagram illustrating a database schema suitable for dependency locks in CICD pipelines, according to some example embodiments.

DETAILED DESCRIPTION

Figure 1:
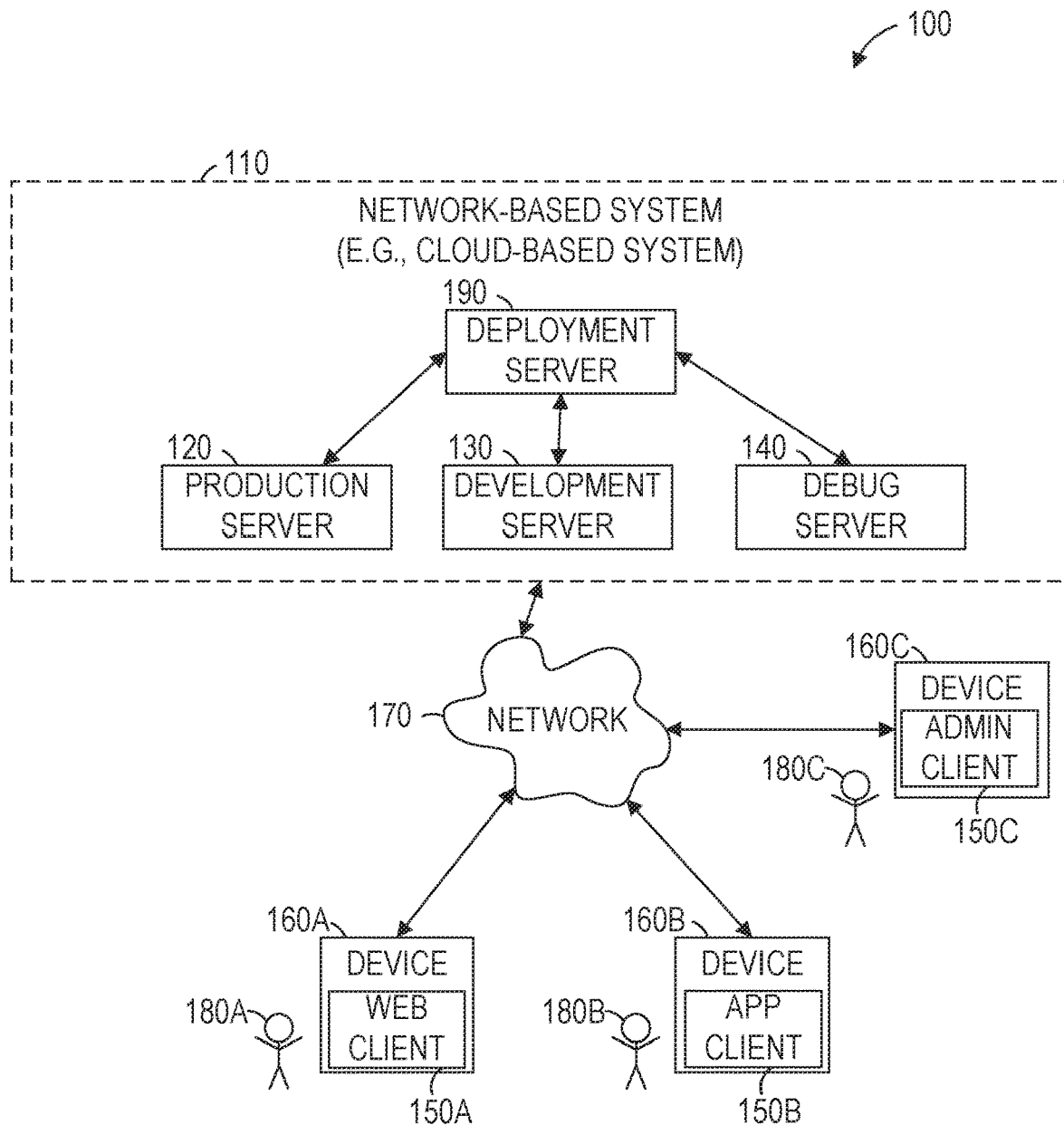
FIG. 1 is a network diagram illustrating a network environment suitable for implementing a dependency lock in CICD pipelines, according to some example embodiments.

Example methods and systems are directed to systems and user interfaces for dependency locks in CICD pipelines. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Deployment of a modified service affects the functioning of other services that make use of the service. For example, deploying a modified graphics library used for the display of images affects all services that make use of the graphics library. Some changes are benign and are unlikely to cause problems. For example, fixing a bug that caused a display routine to take longer than necessary would be unlikely to cause a problem in a service using the display routine. Other changes accidentally cause problems, such as a change that introduces a new bug. Still other changes intentionally require changes to be made in other services, such as changing the parameters used in a function call. Even when no bugs or deliberate changes are introduced, a change may cause an unforeseen problem. For example, improving the speed of a display routine could reveal a race condition bug in a calling service.

To address the problems that deployment of modified executable code can cause in other services, a dependency lock is placed on candidate code to prevent deployment until tests on the dependent services are successfully completed. In existing systems, dependency locks are placed only by an administrator of the service being deployed. Thus, the ability to place a lock on deployment is tied to the ability to modify the code being deployed. This may be sufficient for a single microservices-architecture application but causes problems when multiple applications interrelate. As used herein, a microservices-architecture application refers to a system in which each of multiple small software projects provides a service (also referred to as a microservice) and those services interact to provide higher-level functionality. For example, a login microservice, a point-tracking microservice, and a reward microservice might interact to provide a user rewards program that grants points for actions taken by a logged-in user and grants rewards based on the user's point total.

As described herein, developers of other services that rely on a service are enabled to place a dependency lock on the service. As a result, deployment of the service is only allowed when tests of the other services complete successfully. Alternatively, deployment continues after failure of a test only after an administrator of the service being deployed is made aware of the test failure. The administrator of the service being deployed may control which other users are able to add dependency locks without giving those users other permissions such as the ability to modify the source code of the service, the ability to deploy the service, and the like.

Technical problems exist with respect to deploying services without causing other services to malfunction. The systems and methods described herein address these problems by allowing developers of a first service to place a dependency lock in the CICD pipeline of a second service. As a result of this technical improvement, malfunctions in deployed software are reduced, increasing the uptime of the affected systems.

Additionally, technical problems exist with controlling which user accounts are permitted to place a dependency lock in a CICD pipeline of a service and which user accounts are allowed to modify source code of the service. The systems and methods described herein address these problems by allowing an administrator of a service to control these permissions independently. In prior-art systems, the ability to place dependency locks was equivalent to the ability to modify the code of the service. As a result of this technical improvement, the benefits of dependency locks are obtained without the drawbacks of giving the ability to modify code to accounts that are not intended to modify the code. Specifically, and by example, security may be improved because provision of modify permissions may be avoided.

Additionally, computing resources may be saved by using the systems and methods described herein, which is a further technical improvement. Examples of such computing resources include processor cycles, network traffic, memory usage, data storage capacity, power consumption, and cooling capacity. As just one example, by avoiding a requirement to provide modify permissions to distributed code editors, systems and methods may avoid processor cycles, memory usage, network bandwidth or other computing resources associated with modification of code.

FIG. 1 is a network diagram illustrating a network environment 100 suitable for implementing a dependency lock in CICD pipelines, according to some example embodiments. The network environment 100 includes a network-based system 110, a device 160A, a device 160B, and a device 160C, all communicatively coupled to each other via a network 170. The devices 160A-160C may be collectively referred to as "devices 160," or generically referred to as a "device 160." The network-based system 110 comprises a production server 120, a development server 130, a debug server 140, and a deployment server 190. The devices 160 may interact with the network-based system 110 using a web client 150A or an app client 150B. An administrative client 150C may be implemented as either a web client or an app client. The production server 120, the development server 130, the debug server 140, the deployment server 190, and the devices 160 may each be implemented in a computer system, in whole or in part, as described below with respect to FIG. 2.

The production server 120 provides an application to other machines (e.g., the devices 160) via the network 170. The development server 130 provides a development environment for the application to one or more developers. The developers may access the development server 130 via the network 170 or using another network. The debug server 140 is an intermediate server for testing of an application before the application is deployed to the production server 120. In a typical development pipeline, a developer begins making code changes using the development server 130. The developer deploys the changes to the debug server 140 after minimally observing that the code changes achieve the desired effect (e.g., the addition of a new feature or correction of a bug). The code on the debug server 140 is subjected to more thorough testing (e.g., automated tests, unit tests, interactive tests by quality assurance (QA) personnel, or any suitable combination thereof). If problems are discovered during testing on the debug server 140, the developer makes further changes using the development server 130 until another release candidate is identified and deployed to the debug server 140, and the testing process is repeated. If no problems are discovered during testing on the debug server 140, the code is deployed to the production server 120. The deployment server 190 may control the deployment of the application to the servers 120-140.

Also shown in FIG. 1 are users 180A, 180B, and 180C that may be referred to generically as "a user 180" or collectively as "users 180." Each user 180 may be a human user (e.g., a human being), a machine user (e.g., a computer configured by a software program to interact with the devices 160 and the network-based system 110), or any suitable combination thereof (e.g., a human assisted by a machine or a machine supervised by a human). The users 180 are not part of the network environment 100 but are each associated with one or more of the devices 160 and may be users of the devices 160 (e.g., the user 180A may be an owner of the device 160A, and the user 180B may be an owner of the device 160B). For example, the device 160A may be a desktop computer, a vehicle computer, a tablet computer, a navigational device, a portable media device, or a smartphone belonging to the user 180A.

The deployment server 190 causes presentation of a UI (e.g., on the administrative client 150C) that shows information regarding a CICD pipeline of a service and allows a user to set a dependency lock on the CICD pipeline, to control permissions of other users to set dependency locks on the CICD pipeline, or both.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 2. As used herein, a "database" is a data storage resource that stores data structured as a text file, a table, a spreadsheet, a relational database (e.g., an object-relational database, a NoSQL database, a network or graph database), a triple store, a hierarchical data store, or any suitable combination thereof. Additionally, data accessed (or stored) via an application programming interface (API) or remote procedure call (RPC) may be considered to be accessed from (or stored to) a database. Moreover, any two or more of the machines, databases, or devices illustrated in FIG. 1 may be combined into a single machine, database, or device, and the functions described herein for any single machine, database, or device may be subdivided among multiple machines, databases, or devices.

The network 170 may be any network that enables communication between or among machines, databases, and devices (e.g., the production server 120 and the devices 160). Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
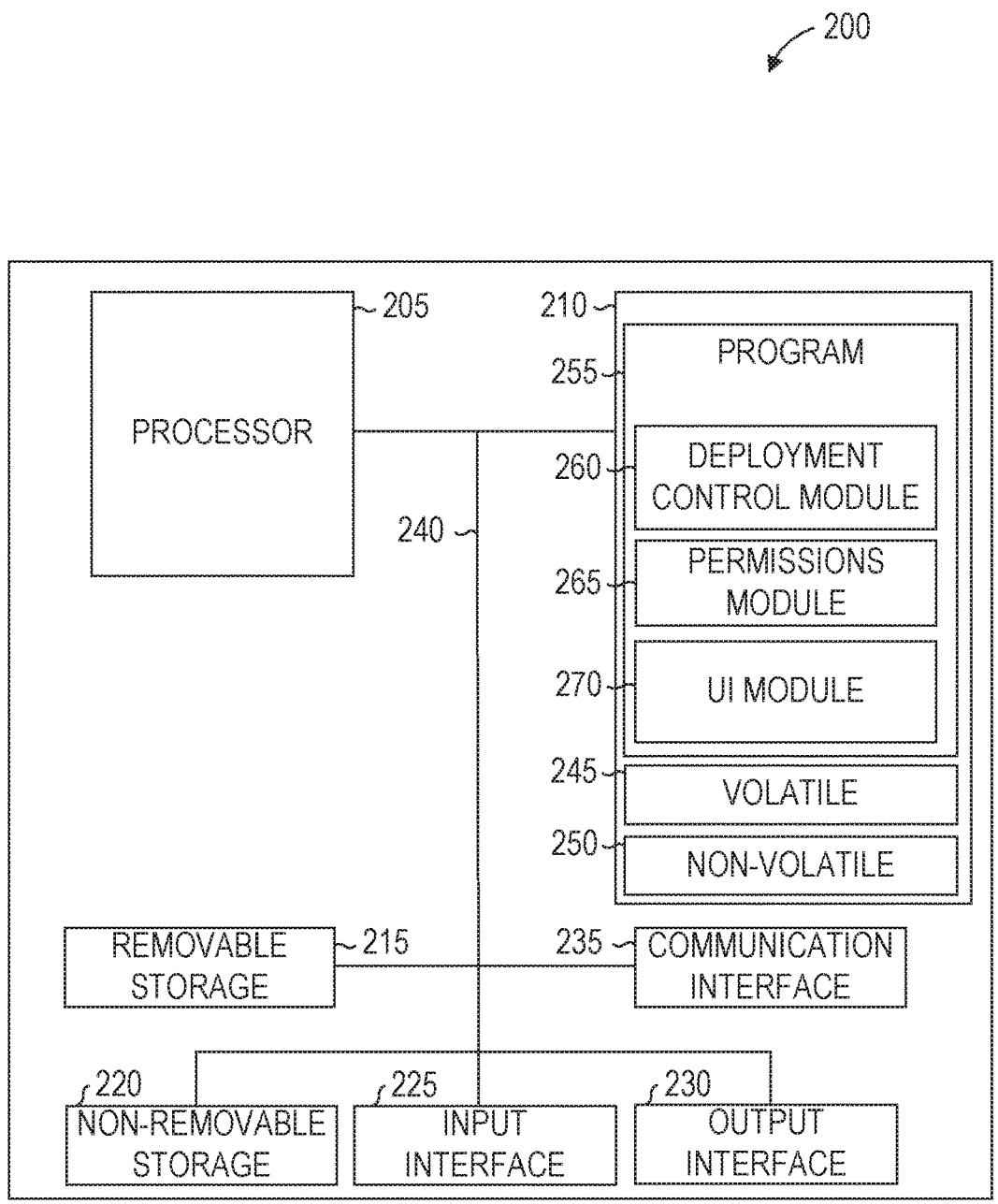
FIG. 2 is a block diagram illustrating components of a computer (e.g., a deployment server according to some example embodiments.

FIG. 2 is a block diagram illustrating components of a computer 200 (e.g., the deployment server 190), according to some example embodiments. All components need not be used in various embodiments. For example, clients, servers, autonomous systems, and cloud-based network resources may each use a different set of components, or, in the case of servers for example, larger storage devices.

One example computing device in the form of the computer 200 (also referred to as a computing device 200 and a computer system 200) may include a processor 205, a computer-storage medium 210, removable storage 215, and non-removable storage 220, all connected by a bus 240. Although the example computing device is illustrated and described as the computer 200, the computing device may be in different forms in different embodiments. For example, the computing device 200 may instead be a smartphone, a tablet, a smartwatch, or another computing device including elements the same as or similar to those illustrated and described with regard to FIG. 2. Devices such as smartphones, tablets, and smartwatches are collectively referred to as "mobile devices." Further, although the various data storage elements are illustrated as part of the computer 200, the storage may also or alternatively include cloud-based storage accessible via a network, such as the Internet, or server-based storage.

The computer-storage medium 210 includes volatile memory 245 and non-volatile memory 250. The volatile memory 245 or the non-volatile memory 250 stores a program 255. The computer 200 may include, or have access to, a computing environment that includes a variety of computer-readable media, such as the volatile memory 245, the non-volatile memory 250, the removable storage 215, and the non-removable storage 220. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 200 includes or has access to a computing environment that includes an input interface 225, an output interface 230, and a communication interface 235. The output interface 230 interfaces to or includes a display device, such as a touchscreen, that also may serve as an input device. The input interface 225 interfaces to or includes one or more of a touchscreen, a touchpad, a mouse, a keyboard, a camera, one or more device-specific buttons, one or more sensors integrated within or coupled via wired or wireless data connections to the computer 200, and other input devices. The computer 200 may operate in a networked environment using the communication interface 235 to connect to one or more remote computers, such as database servers. The remote computer may include a personal computer (PC), server, router, network PC, peer device or other common network node, or the like. The communication interface 235 may connect to a local-area network (LAN), a wide-area network (WAN), a cellular network, a WiFi network, a Bluetooth network, or other networks.

Computer instructions stored on a computer-storage medium (e.g., the program 255 stored in the computer-storage medium 210) are executable by the processor 205 of the computer 200. As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The program 255 may further be transmitted or received over the network 170 using a transmission medium via the communication interface 235 and utilizing any one of a number of well-known transfer protocols (e.g., Hypertext Transfer Protocol (HTTP)). Examples of networks 170 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the computer 200, and includes digital or analog communications signals or other intangible media to facilitate communication of such software.

The program 255 is shown as including a deployment control module 260, a permissions module 265, and a user interface (UI) module 270. Any one or more of the modules described herein may be implemented using hardware (e.g., a processor of a machine, an application-specific integrated circuit (ASIC), an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The deployment control module 260 controls deployment of services to the debug server 140, the production server 120, or both. The deployment control module 260 also enables creation of dependency locks. In some example embodiments, the deployment control module 260 accesses a dependency lock on a CICD pipeline of a first service, invokes a test function of a dependent service identified by the dependency lock, and permits deployment of the first service only if the test function completes successfully.

The permissions module 265 controls permissions for the modification of the source code for services, for the ability to create dependency locks in CICD pipelines, or both. For example, an administrator account for a service may be enabled by the permissions module 265 to set permissions for other accounts to modify source code for the service, to create dependency locks in the CICD pipeline of the service, or both. Additionally or alternatively, the administrator account for a first service may be enabled by the permissions module 265 to set a permission for another service to create dependency locks in the CICD pipeline of the first service. Thus, accounts associated with the other service would be enabled by the deployment control module 260 to create dependency locks in the CICD pipeline of the first service.

The UI module 270 causes presentation of a UI for the deployment server 190 to the user 180C. The UI allows the user 180C to create dependency locks, see the results of tests invoked by dependency locks, give permissions to other users to create dependency locks, or any suitable combination thereof.

FIG. 3 is a block diagram illustrating a database schema 300 suitable for dependency locks in CICD pipelines, according to some example embodiments. The database schema 300 may be suitable for use by the permissions module 265 and the deployment control module 260. The database schema 300 includes a permissions table 310 and a dependency lock table 350. The permissions table 310 is defined by a table definition 320, including an account identifier field, a first project field, a second project field, and a third project field. The permissions table 310 includes rows 330A, 330B, 330C, and 330D. The dependency lock table 350 is defined by a table definition 360, including a supplier service field, a supplier stage field, a client service field, and a client stage field. The dependency lock table 350 includes rows 370A, 370B, and 370C.

Each of the rows 330A-330D stores information for a user account. Each project field stores a list of permissions held by the user account for the project. Thus, the user account with account identifier 1001 has edit, deploy, and lock permissions for the EasyDNS API project; only lock permissions for the EasyDNS Backend project; and no permissions for the EasyDNS Dashboard project. As a result, the permissions module 265 will allow the user account 1001 to edit the source code for the EasyDNS API project, deploy the EasyDNS API project, and create dependency locks on the EasyDNS API project. Further, the permissions module 265 will allow the user account 1001 to create dependency locks on the EasyDNS Backend project but not to modify the source code for the EasyDNS Backend project or to deploy the EasyDNS Backend project. Other combinations of permissions are possible. For example, the row 330D shows that the user account 1004 has permissions to edit and lock the EasyDNS Backend project, but not to deploy the project.

The dependency lock table 350 stores information for a single dependency lock in each of the rows 370A-370C. The supplier service field identifies the service on which the dependency lock is placed. The supplier stage field identifies the stage of the deployment pipeline of the supplier service before which the lock will be handled. The client service and client stage fields identify the stage of the client service that will be run to determine if the deployment pipeline of the supplier service can continue to the supplier stage. Phrased another way, the supplier service is a service that supplies functionality, and the client service is a service that makes use of the supplied functionality. Two services may be interrelated such that each of the two services provides functionality used by the other. In this case, each of the two services would be both a supplier service and a client service of the other.

As an example, the row 370A defines a dependency lock that will execute the Integration Test stage of the EasyDNS Backend client service to determine if the deployment pipeline for the EasyDNS API supplier service is allowed to proceed to the Deploy to Production stage. In various example embodiments, one or more additional fields are added to the dependency lock table 350 to support external dependency locks, one or more additional tables are added to the database schema 300 to support external dependency locks, or both.

Figure 4:
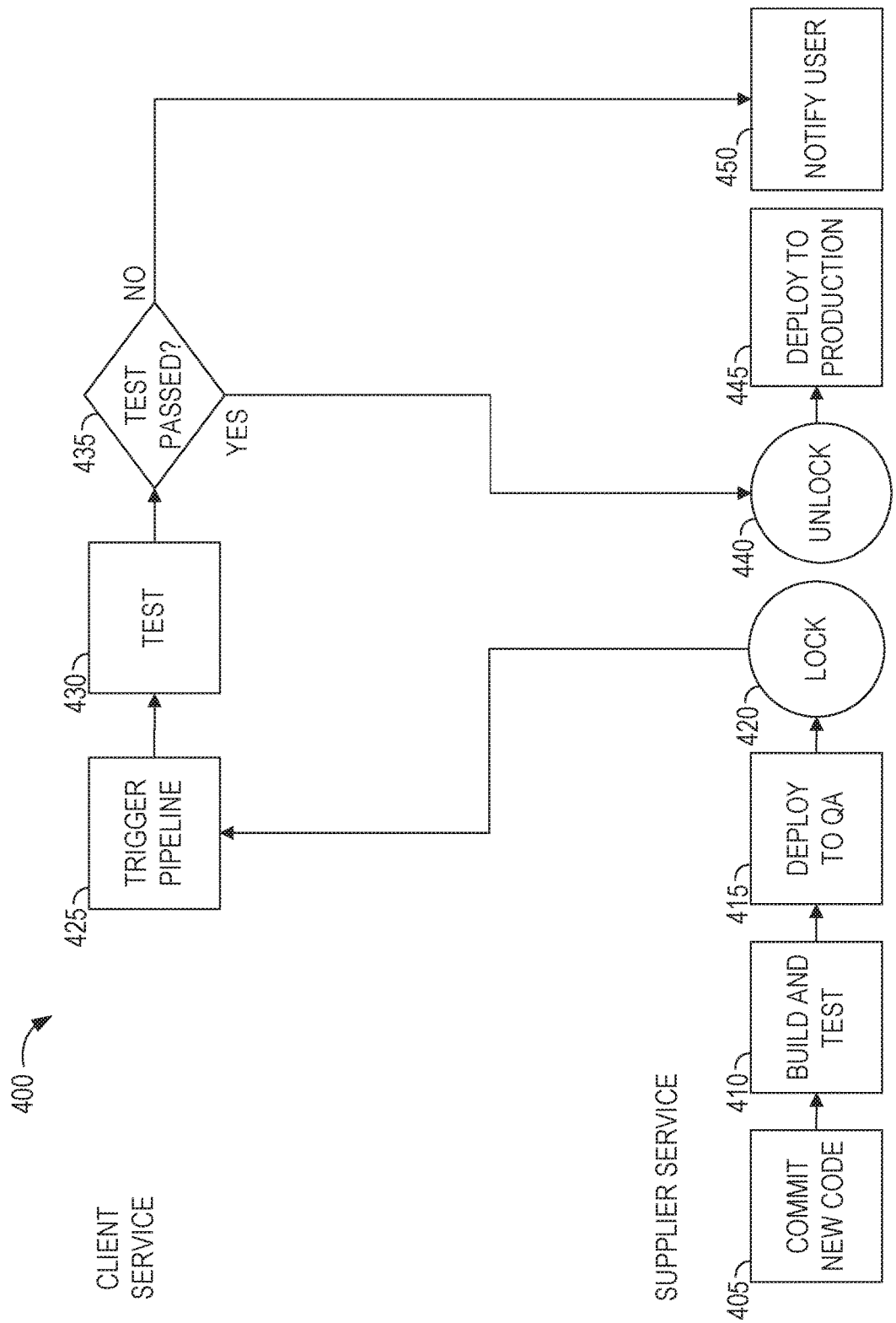
FIG. 4 is a flow diagram illustrating operations on a supplier service and a client service in implementing a dependency lock in a CICD pipeline, according to some example embodiments.

FIG. 4 is a flow diagram 400 illustrating operations on a supplier service and a client service in implementing a dependency lock in a CICD pipeline, according to some example embodiments. The flow diagram 400 includes operations 405, 410, 415, 420, 440, 445, and 450 on the supplier service and operations 425, 430, and 435 on the client service.

In operation 405, new code is committed for the supplier service. For example, a developer may use a code management application such as Git or CVS to commit code changes to the development server 130. The supplier service, including the new code, is built and tested in operation 410. Operations 405 and 410 may be repeated until the supplier service tests are passed. For example, a test function in the supplier service may automatically be run as part of the build process. The test function may return a value of 0 if the test is successful and a non-zero error code value if the test is not successful. The deployment pipeline for the supplier service may automatically halt if the test fails and automatically proceed to operation 415 if the test succeeds. Alternatively, the developer may be informed of the result of the test and manually invoke operation 415 if the test is successful.

In operation 415, the updated code (or objects or executables generated from the updated code) is deployed to a QA environment (e.g., the debug server 140). After each step of the deployment pipeline for the supplier service (comprising operations 405, 410, 415, and 445), the deployment server 190 checks to see if there is a lock on the deployment pipeline. In the example of FIG. 4, a lock on the supplier service has been created that must be cleared by the client service before modifications to the supplier service are allowed to be deployed to production. Accordingly, operation 420, locking the pipeline, and operation 440, unlocking the pipeline, are performed before operation 445, deploying to production.

After the supplier service deployment pipeline is locked in operation 420, the client service pipeline is triggered in operation 425. The current code for the client service is tested (operation 430) in the QA environment, using the modified supplier service. In operation 435, the results of the test are checked. If the test was successful, the supplier service pipeline is unlocked (operation 440) and the supplier service is deployed to the production server 120 in operation 445. If the test was not successful, the developer of the supplier service is notified in operation 450. For example, a UI used to control the deployment pipeline of the supplier service may indicate that the test failed and deployment to the server is locked.

Figure 5:
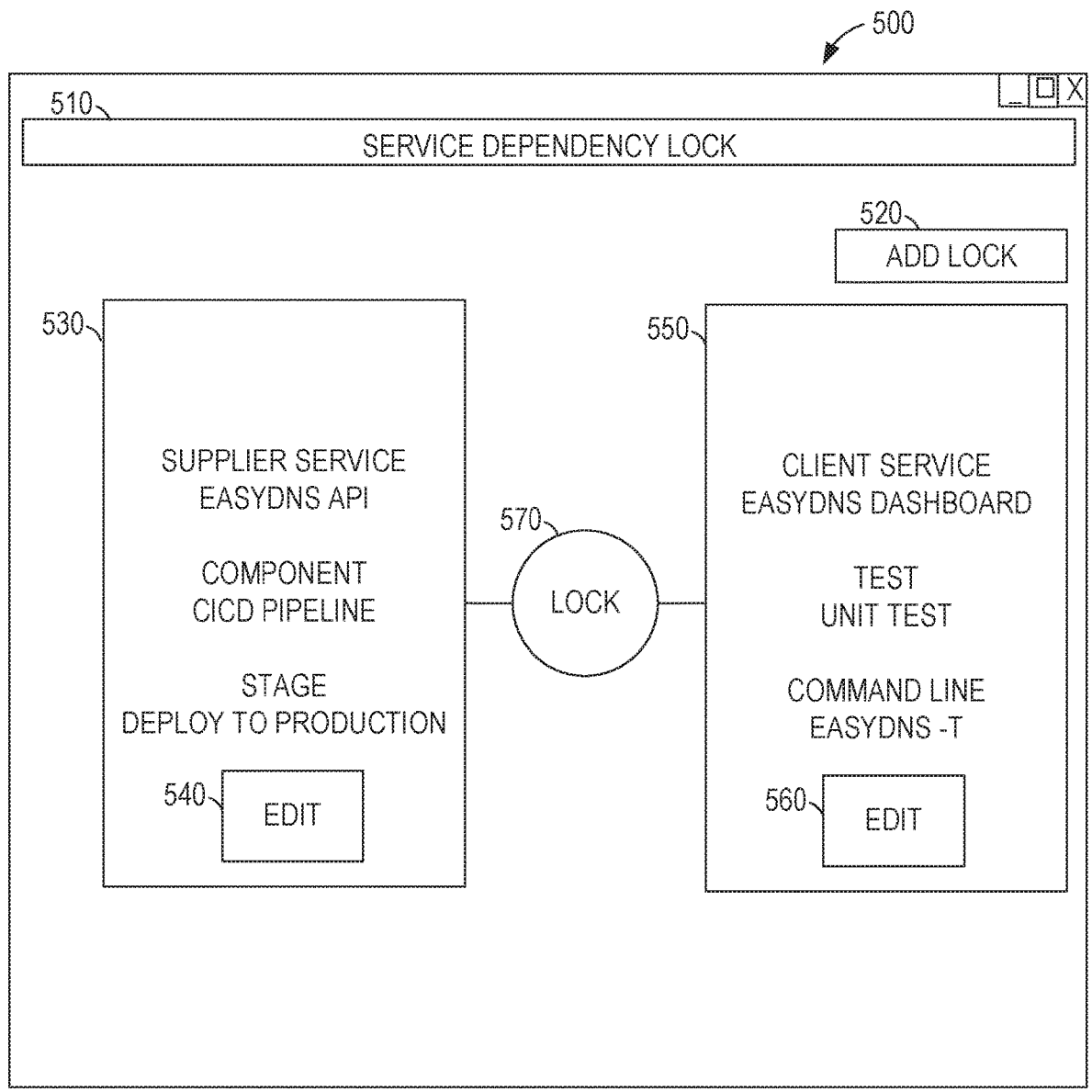
FIG. 5 is a block diagram illustrating a user interface suitable for creating a service dependency lock in a CICD pipeline, according to some example embodiments.

FIG. 5 is a block diagram illustrating a user interface 500 suitable for creating a service dependency lock in a CICD pipeline, according to some example embodiments. The service dependency lock is a lock on the supplier service by a client service within the same microservices application. The user interface 500 includes a title 510, a supplier service area 530, a client service area 550, a lock indicator 570 (e.g., a lock icon), and buttons 520, 540, and 560. The user interface 500 may be displayed to a user with permissions to place a lock on a supplier service, independent of permissions to modify or deploy the supplier service. The title 510 displays a title for the user interface 500.

The supplier service area 530 indicates the supplier service, the component of the supplier service, and the stage of the component on which the dependency lock is to be placed. The button 540 is operable to cause the display of another user interface (e.g., a user interface 800 described below with respect to FIG. 8) for changing the supplier service, the component, the stage, or any suitable combination thereof.

The client service area 550 indicates the client service, the type of test of the client service to be run to clear the dependency lock, and the command line to use to invoke the test. The button 560 is operable to cause the display of another user interface (e.g., a user interface 900, described below with respect to FIG. 9) for changing the client service, the component, the stage, or any suitable combination thereof. In FIG. 5, the type of the test is unit test. Accordingly, the command line invokes a test function implemented by the client service. In some example embodiments, the test may be a script. In that case, the command line invokes a script that invokes the client service, typically (though not necessarily) by performing one or more commands to set up a test and to compare results provided by the client service with expected results. Alternatively, the test may be an API test and the command line option may be replaced with a URL option. In these embodiments, the URL is used to access the API.

The button 520 is operable to create a dependency lock with the settings shown in the supplier service area 530 and the client service area 550. Thus, with the settings shown in FIG. 5, operation of the button 520 causes the deployment server 190 to create a dependency lock on the Deploy To Production stage of the CICD pipeline component of the supplier service EasyDNS API, wherein the lock is cleared only if the Integration Test stage of the CICD pipeline component of the client service EasyDNS Dashboard is passed.

Figure 6:
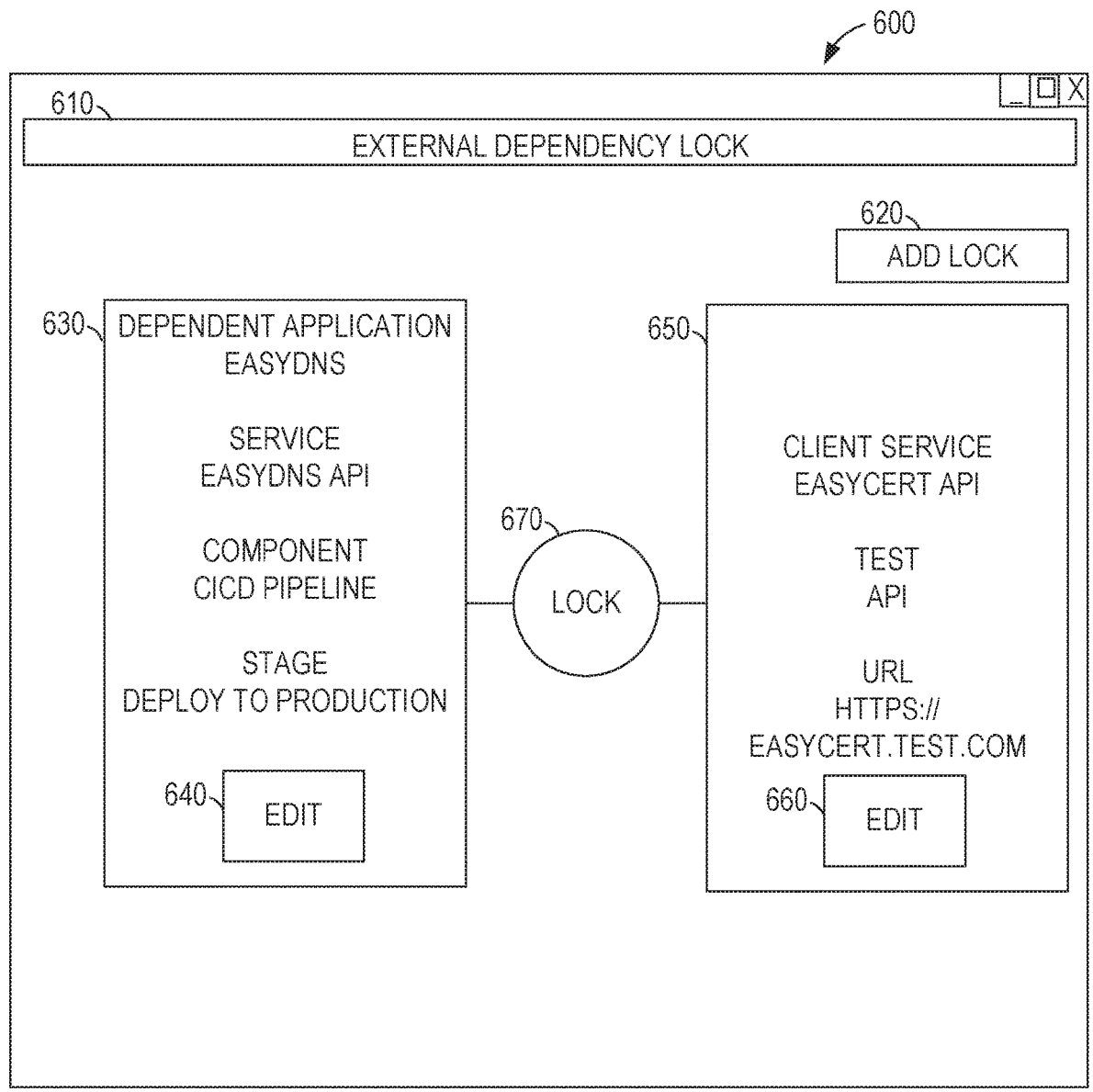
FIG. 6 is a block diagram illustrating a user interface suitable for creating an external dependency lock in a CICD pipeline, according to some example embodiments.

FIG. 6 is a block diagram illustrating a user interface 600 suitable for creating an external dependency lock in a CICD pipeline, according to some example embodiments. The external dependency lock is a lock on the supplier service by a client service not in the same microservices application as the supplier service. The user interface 600 includes a title 610, a supplier service area 630, a client service area 650, a lock indicator 670 (e.g., a lock icon), and buttons 620, 640, and 660. The user interface 600 may be displayed to a user with permissions to place a lock on a supplier service, independent of permissions to modify or deploy the supplier service. The title 610 displays a title for the user interface 600.

The supplier service area 630 indicates the dependent application comprising the supplier service, the supplier service, the component of the supplier service, and the stage of the component on which the dependency lock is to be placed. In comparison with the supplier service area 530, the dependent application has been added to the supplier service area 630 because the user interface 600 is for creation of a dependency lock across applications. Thus, the user interface 500 uses the same application for the supplier service as for the client service, and the user interface 600 explicitly specifies the application of the supplier service. The button 640 is operable to cause the display of another user interface (e.g., a variation of the user interface 800) for changing the dependent application, the supplier service, the component, the stage, or any suitable combination thereof.

The client service area 650 indicates the client service, the type of test to run to clear the dependency lock, and URL to use access the API for the test. The button 660 is operable to cause the display of another user interface (e.g., the user interface 900) for changing the client service, the component, the stage, or any suitable combination thereof. In the example of FIG. 6, the type of test is API so the additional information provided to invoke the test is a URL instead of a command line. Additional parameters may be provided as part of the URL (e.g., by appending ?parameterOne=ValueOne&parameterTwo=ValueTwo for a list of parameters and values).

The button 620 is operable to create a dependency lock with the settings shown in the supplier service area 630 and the client service area 650. Thus, with the settings shown in FIG. 6, operation of the button 620 causes the deployment server 190 to create a dependency lock on the Deploy To Production stage of the CICD pipeline component of the supplier service EasyDNS API in the EasyDNS application, wherein the lock is cleared only if the Integration Test stage of the CICD pipeline component of the client service EasyCert API is passed.

Figure 7:
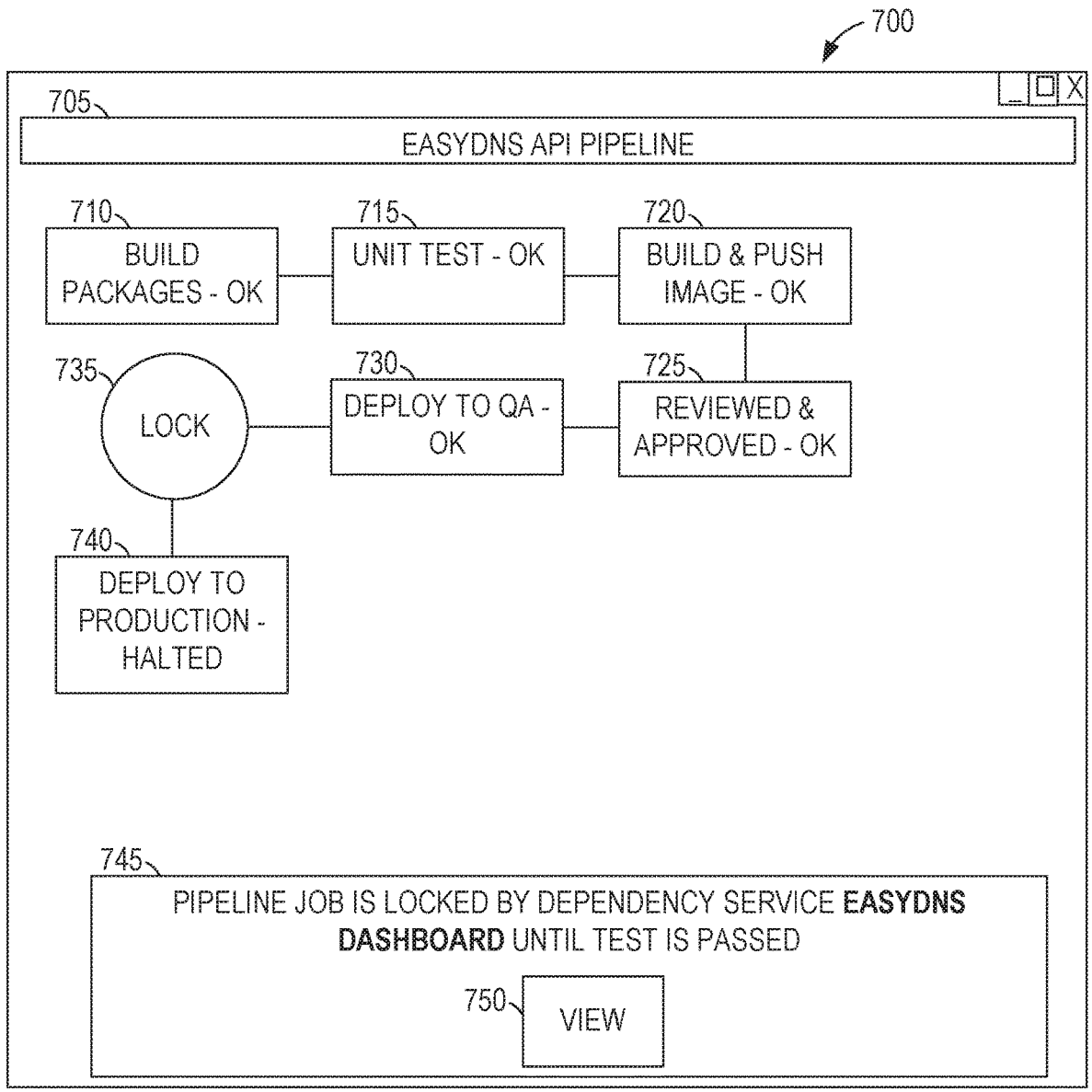
FIG. 7 is a block diagram illustrating a user interface suitable for displaying a dependency lock in a CICD pipeline, according to some example embodiments.

FIG. 7 is a block diagram illustrating a user interface 700 suitable for displaying a dependency lock in a CICD pipeline, according to some example embodiments. The user interface 700 includes a title 705, pipeline stage indicators 710, 715, 720, 725, 730, and 740, a lock indicator 735, a status area 745, and a button 750. The title 705 displays a title for the user interface 700.

Each of the pipeline stage indicators 710, 715, 720, 725, 730, and 740 indicates a stage of the pipeline and a corresponding status for the stage. In the example of FIG. 7, the pipeline stage indicators 710-730 indicate that the stage is "OK" and has successfully completed. The pipeline stage indicator 740 indicates that the stage has been halted. In some example embodiments, each pipeline stage indicator is color-coded to indicate the status of the stage. As in FIG. 7, lines or other graphical indicators may be used to show the sequence of the stages in the pipeline.

In some example embodiments, the first pipeline stage indicator 710 is initially operable to cause performance of the first stage of the pipeline, and the other pipeline stage indicators 715, 720, 725, 730, and 740 are initially inoperable. In response to operation of the first pipeline stage indicator 710, the first stage is performed and the first pipeline stage indicator 710 is updated to indicate the status of the first stage. If the first stage is successful, the next pipeline stage indicator (in this example, the pipeline stage indicator 715) becomes operable to perform that stage. Thus, the user interface 700 allows for each step of the deployment pipeline to be performed by operating each of the pipeline stage indicators in succession. However, if a dependency lock on the next stage exists, operation of a pipeline stage indicator will cause the test associated with the dependency lock to be performed, and the pipeline will proceed to the next stage only if the test is successful. If the test is unsuccessful, the deployment control module 260 will deny the request to proceed to the next stage in the pipeline.

The lock indicator 735 is displayed in the pipeline before the stage that is affected by a dependency lock. The user interface 700 may be displayed after the service dependency lock of FIG. 5 has been added, applying a lock before the Deploy To Production stage and creating the row 370B (FIG. 3).

The status area 745 includes an informational message identifying data associated with the dependency lock indicated by lock indicator 735 such as the client service, the client service stage, the client service component, the client service application, the supplier service, the supplier service stage, the supplier service component, the supplier service application, or any suitable combination thereof. The button 750 is operable to cause another user interface (e.g., the user interface 500) to be displayed, wherein the other user interface displays additional information regarding the dependency lock.

Figure 8:
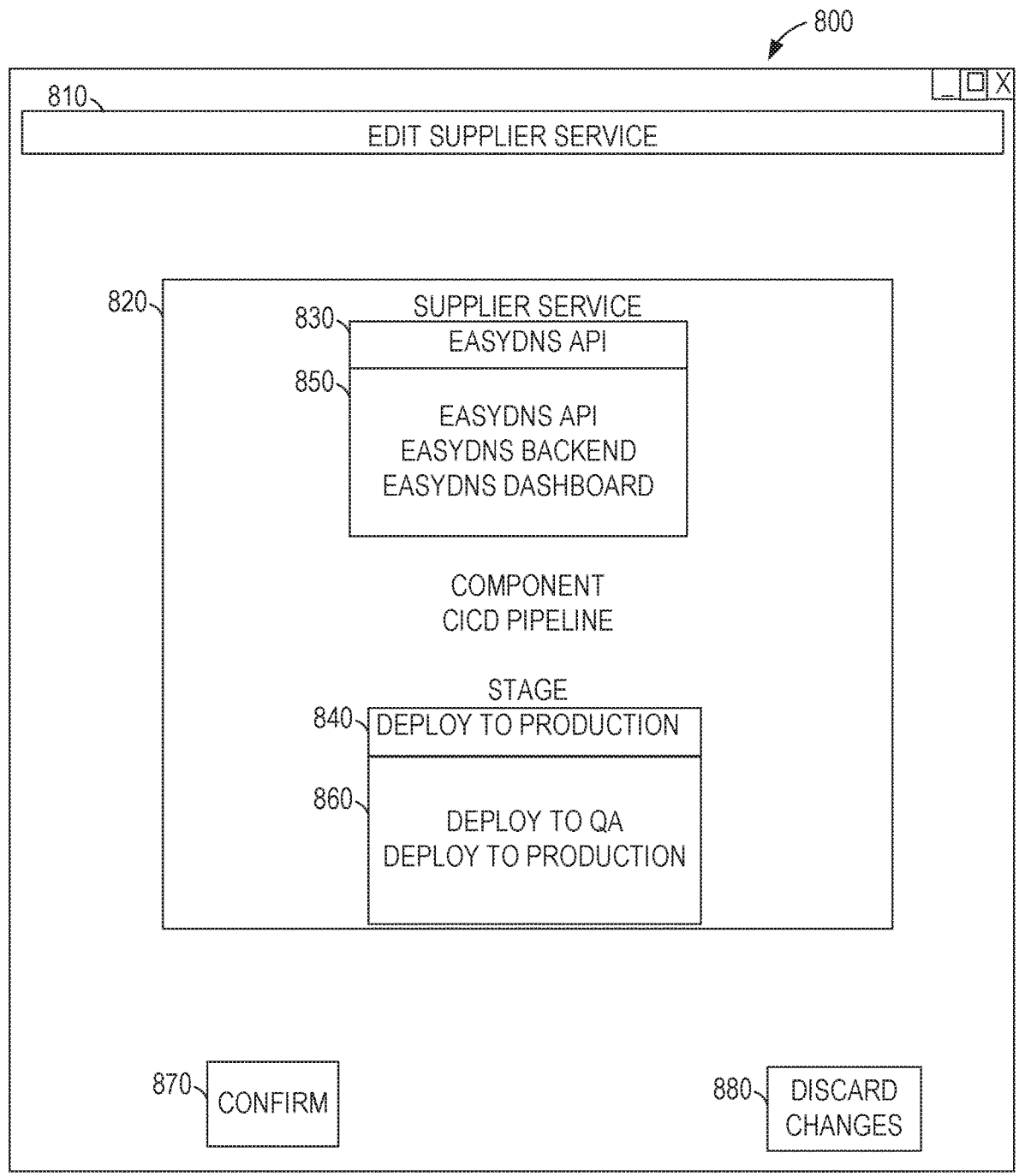
FIG. 8 is a block diagram illustrating a user interface suitable for creating a service dependency lock in a CICD pipeline, according to some example embodiments.

FIG. 8 is a block diagram illustrating a user interface 800 suitable for creating a service dependency lock in a CICD pipeline, according to some example embodiments. The user interface 800 may be displayed in response to operation of the button 540 (FIG. 5) and includes a title 810, a configuration area 820, and buttons 870 and 880. The configuration area 820 includes a supplier service selector 830, supplier service options 850, a stage selector 840, and stage options 860. The title 810 displays a title for the user interface 800.

The configuration area 820 includes options for the supplier service of the dependency lock, enabling a user to set one or more of the supplier service, supplier service component, and supplier service stage. The supplier service selector 830 receives user input to indicate a supplier service. The supplier service selector 830 may be implemented as a text box, a drop-down selector, a combo box, a set of radio buttons, or another UI element. The supplier service options 850 may be displayed in response to a touch, selection, or mouse-over of the supplier service selector 830 and include one or more predetermined options for the supplier service. In some example embodiments, the supplier services listed in the supplier service options 850 are determined by accessing the permissions table 310 (FIG. 3). For example, the account ID of a logged-in user may be used to determine which projects the user has permission to lock, and the supplier service options 850 may be pre-populated by the deployment server 190 with identifiers of those projects.

The stage selector 840 receives user input to indicate a stage of the supplier service on which the dependency lock is to be placed. The stage selector 840 may be implemented as a text box, a drop-down selector, a combo box, a set of radio buttons, or another UI element. The stage options 860 may be displayed in response to a touch, selection, or mouse-over of the stage selector 840 and include one or more predetermined options for the stage. In some example embodiments, the stages listed in the stage options 860 are determined by an administrator for the supplier service identified in the supplier service selector 830.

The buttons 870 and 880 are operable to dismiss the user interface 800 and return to a previous user interface (e.g., the user interface 500 of FIG. 5). Detection of operation of the button 870 causes the deployment server 190 to save the changes made to the supplier service settings, and detection of operation of the button 880 causes the deployment server 190 to discard the changes, reverting to the previous settings.

Figure 9:
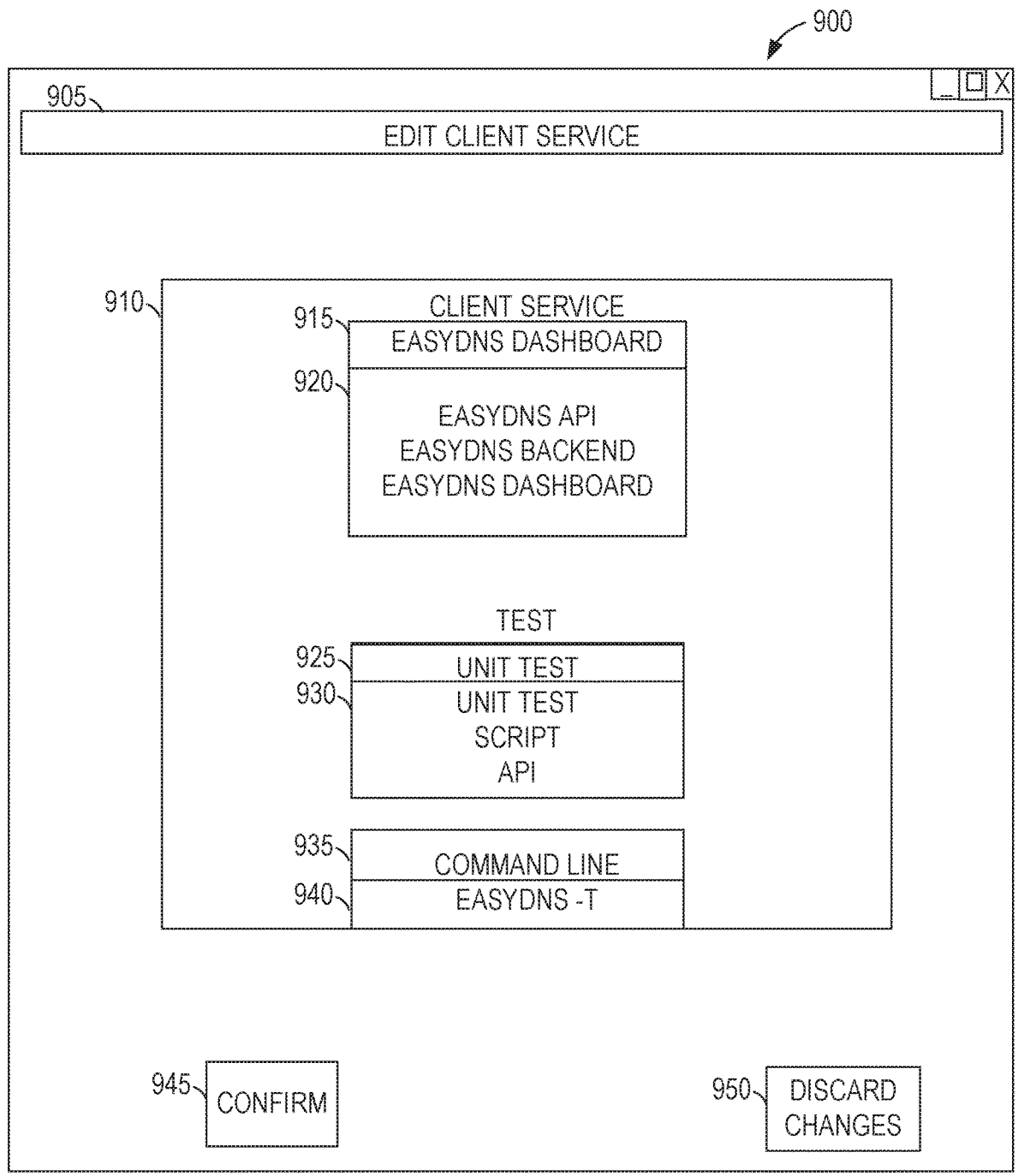
FIG. 9 is a block diagram illustrating a user interface suitable for creating a service dependency lock in a CICD pipeline, according to some example embodiments.

FIG. 9 is a block diagram illustrating a user interface 900 suitable for creating a service dependency lock in a CICD pipeline, according to some example embodiments. The user interface 900 may be displayed in response to operation of the button 560 (FIG. 5) and includes a title 905, a configuration area 910, and buttons 945 and 950. The configuration area 910 includes a client service selector 915, client service options 920, a test type selector 925, test type options 930, test invocation type indicator 935, and test invocation data 940. The title 905 displays a title for the user interface 900.

The configuration area 910 includes options for the client service of the dependency lock, enabling a user to set one or more of the client service, client service component, and client service stage. The client service selector 915 receives user input to indicate a client service. The client service options 920 may be displayed in response to a touch, selection, or mouse-over of the client service selector 915 and include one or more predetermined options for the client service. In some example embodiments, the client services listed in the client service options 920 are determined by accessing the permissions table 310 (FIG. 3). For example, the account ID of a logged-in user may be used to determine which projects the user has permission to edit, and the client service options 920 may be pre-populated by the deployment server 190 with identifiers of those projects.

The test type selector 925 receives user input to indicate a type of test to be performed by the client service placing the dependency lock. The test type options 930 may be displayed in response to a touch, selection, or mouse-over of the test type selector 925 and include one or more predetermined options for the stage. In some example embodiments, the stages listed in the test type options 925 are determined by an administrator for the client service identified in the client service selector 915.

The test invocation type indicator 935 indicates whether the test will be invoked using a command line or a URL. The value shown in the test invocation type indicator 935 may be based on the selection in the test type selector 925. For example, the test invocation type indicator 935 may indicate that the test will be run using a command line if "unit test" or "script" are selected by the test type selector 925 or that the test will be run via a URL if "API" is selected by the test type selector 925. The test invocation data 940 receives user input (e.g., user text input provided via a keyboard) providing the means for invoking the test. Thus, in the example of FIG. 9, a unit test will be invoked via a command line interface using the command "EASYDNS-T."

The buttons 945 and 950 are operable to dismiss the user interface 900 and return to a previous user interface (e.g., the user interface 500 of FIG. 5). Detection of operation of the button 945 causes the deployment server 190 to save the changes made to the client service settings, and detection of operation of the button 950 causes the deployment server 190 to discard the changes, reverting to the previous settings.

Figure 10:
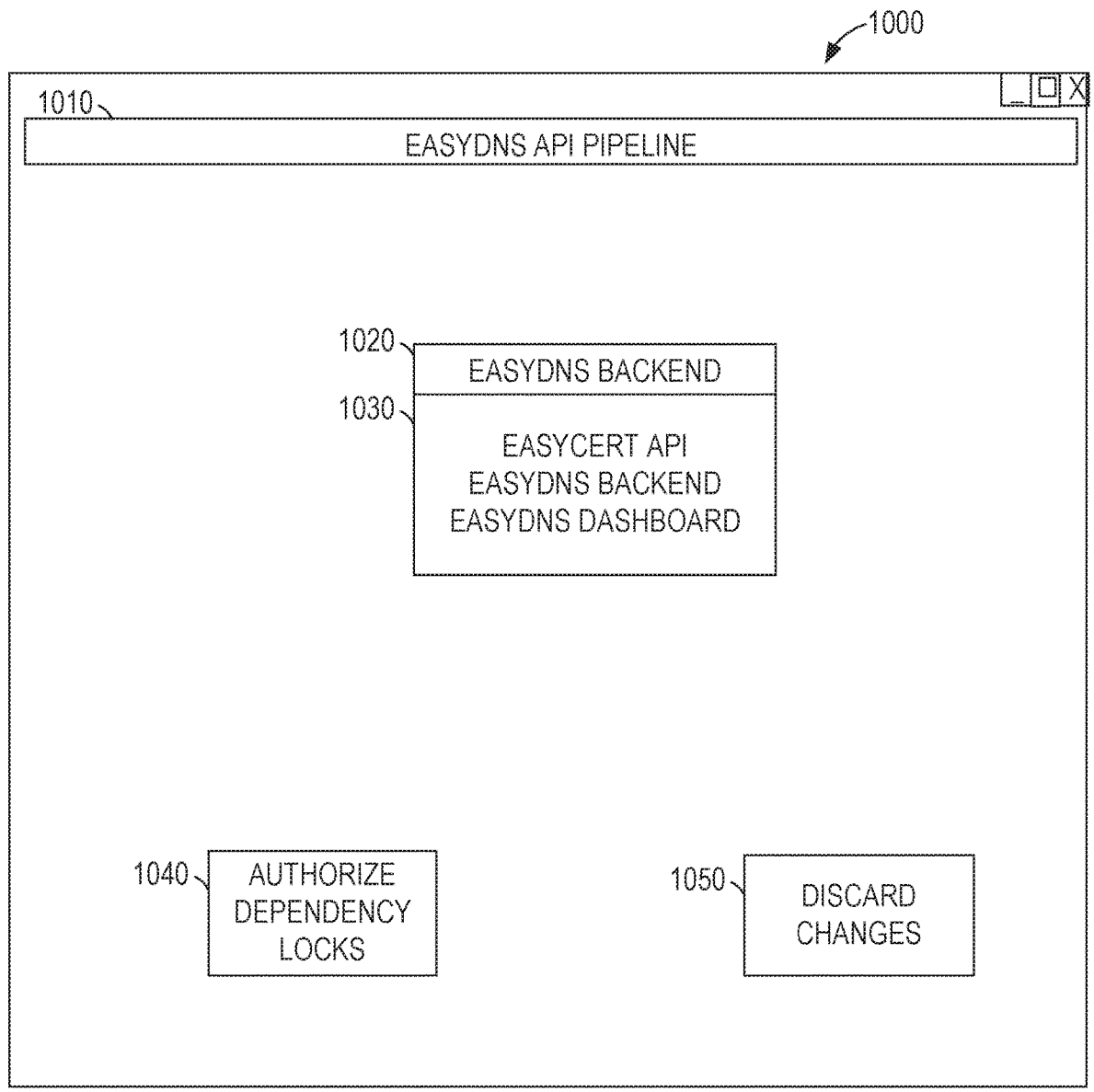
FIG. 10 is a block diagram illustrating a user interface suitable for setting a permission to create a service dependency lock in a CICD pipeline, according to some example embodiments.

FIG. 10 is a block diagram illustrating a user interface 1000 suitable for setting a permission to create a service dependency lock in a CICD pipeline, according to some example embodiments. The user interface 1000 may be displayed to an administrator of a supplier service and includes a title 1010, a client service selector 1020, client service options 1030, and buttons 1040 and 1050. The title 1010 displays a title for the user interface 1000. The administrator is a user of an account with permissions to modify the supplier service (e.g., the account 1001 of FIG. 3, with edit permissions for the first project). The user interface 1000 may be displayed on a device associated with the administrator's account (e.g., the device 160C of FIG. 1, accessed by the user 180C logged in with account ID 1001).

The client service selector 1020 receives user input to indicate a client service. The client service options 1030 may be displayed in response to a touch, selection, or mouse-over of the client service selector 1020 and include one or more predetermined options for the client service. In some example embodiments, the client service selector 1020 receives an identifier of the client service from the administrator via a text input. For example, the administrator may type in a name of the client service, a numeric identifier of the client service, or a URL associated with the client service, or otherwise identify the client service.

The buttons 1040 and 1050 are operable to dismiss the user interface 1000 and return to a previous user interface (e.g., an administrator control panel). Detection of operation of the button 1040 causes the deployment server 190 to update the permissions of one or more accounts associated with the client service selected in the client service selector 1020. Detection of operation of the button 1050 causes the deployment server 190 to discard the changes, reverting to the previous settings.

Thus, operation of the button 1040 acts as an authorization by the administrator of the supplier service, authorizing one or more accounts associated with the selected client service to place dependency locks on the deployment pipeline of the supplier service.

Figure 11:
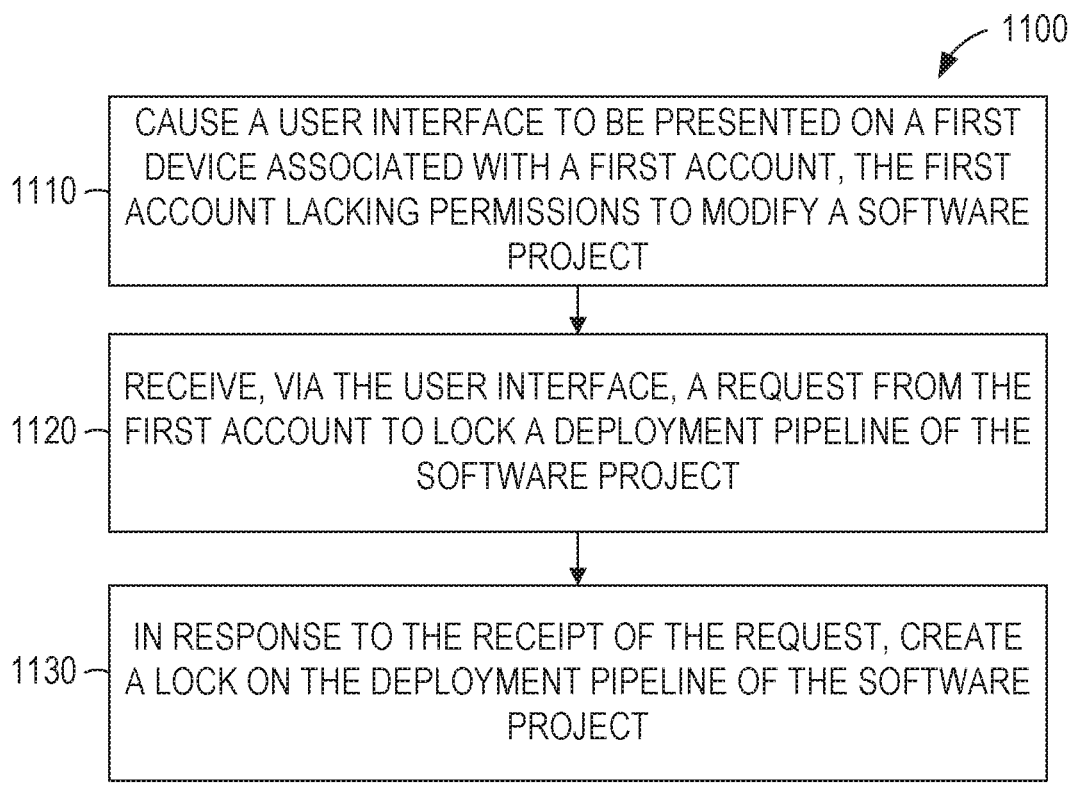
FIG. 11 is a flowchart illustrating operations of a computing device in performing a method of creating a dependency lock in a CICD pipeline, according to some example embodiments.

FIG. 11 is a flowchart illustrating operations of a computing device in performing a method 1100 of creating a dependency lock in a CICD pipeline, according to some example embodiments. The method 1100 includes operations 1110, 1120, and 1130. By way of example and not limitation, the method 1100 is described as being performed by the systems of FIG. 1 and the modules of FIG. 2.

In operation 1110, the UI module 270 causes a user interface to be presented on a first device associated with a first account, the first account lacking permissions to modify a software project. For example, the deployment server 190 may cause the user interface 500 (FIG. 5) to be presented on the device 160A via the web client 150A. Prior to operation 1110, the user 180A may have logged into an account (e.g., by providing a user name and password), thus causing the device 160A to be associated with the logged-in account. With reference to FIG. 3, the account ID of the account may be 1002, an account having lock permissions for the first project but not having editing permissions for the first project. The lock permissions may have been granted to the account 1002 by the account 1001, via the user interface 1000.

In operation 1120, the deployment control module 260 receives, via the user interface and the UI module 270, a request from the first account to lock a deployment pipeline of the software project. With reference to FIG. 5, the request may be triggered by operation of the button 520, labeled "Add Lock."

In operation 1130, the deployment control module 260, in response to the receipt of the request, creates a lock on the deployment pipeline of the software project (e.g., by creating a row in the dependency lock table 350 of FIG. 3). Thus, based on the settings associated with the lock, future deployment of the software project will be halted unless the lock is cleared by a test associated with the lock. In the example of FIG. 5 and the row 370B of FIG. 3, the dependency lock will cause the deployment pipeline of the EasyDNS API to stop before deploying to production unless the integration test of the EasyDNS Dashboard service completes successfully.

In some example embodiments, the permission module 265, in response to the receipt of the request, checks the permissions associated with the requesting account to verify that lock permissions for the supplier service are enabled. In this way, the creation of the lock is further based on the permission and, in embodiments making use of the authorization user interface of FIG. 10, the authorization received from the administrator of the supplier service.

Figure 12:
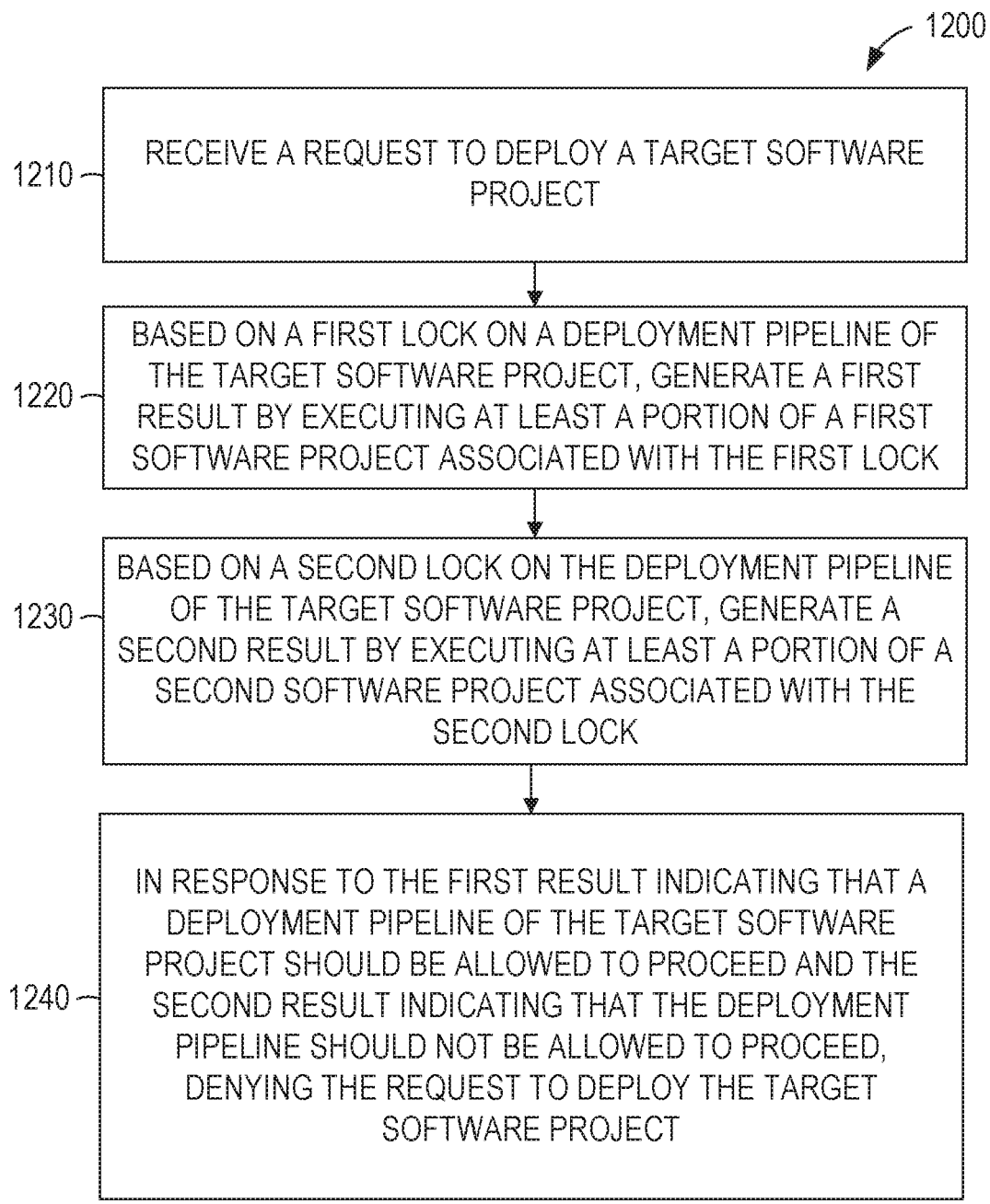
FIG. 12 is a flowchart illustrating operations of a computing device in performing a method of implementing a dependency lock in a CICD pipeline, according to some example embodiments.

FIG. 12 is a flowchart illustrating operations of a computing device in performing a method 1200 of implementing a dependency lock in a CICD pipeline, according to some example embodiments. The method 1200 includes operations 1210, 1220, 1230, and 1240. By way of example and not limitation, the method 1200 is described as being performed by the systems of FIG. 1 and the modules of FIG. 2.

In operation 1210, the deployment control module 260 receives, via the user interface and the UI module 270, a request to deploy a target software project. In the example of FIG. 7, the request is for deployment of the EasyDNS API.

In operation 1220, the deployment control module 260, based on a first lock on a deployment pipeline of the target software project, generates a first result by executing at least a portion of a first software project associated with the first lock. With reference to the example of FIG. 5 and row 370B of FIG. 3, the integration test of the EasyDNS Dashboard service is executed to generate a first result. The first result indicates whether the portion of the first software project executed successfully or not.

In operation 1230, the deployment control module 260, based on a second lock on the deployment pipeline of the target software project, generates a second result by executing at least a portion of a second software project associated with the second lock. With reference to the example of FIG. 6, the integration test of the EasyCert API service is executed to generate a second result. The second result indicates whether the portion of the second software project executed successfully or not.

The deployment control module 260, in operation 1240, denies the request to deploy the target software project in response to the first result indicating that the deployment pipeline should be allowed to proceed (e.g., that the portion of the first software project executed successfully) and the second result indicating that the deployment pipeline should not be allowed to proceed (e.g., that the portion of the second software project did not execute successfully). In the example of FIG. 7, the EasyDNS API deployment pipeline is locked by the client service EasyDNS Dashboard even though one or more other locks were unlocked due to successful tests.

The methods and techniques disclosed herein improve the functioning of computers deploying software using CICD pipelines. In prior-art systems, only the developers of a service could define tests to be run before deployment, thus allowing deployment of a service to cause other services to fail. By contrast, by using the systems and methods described herein, developers of client services are enabled to define tests to be run before a supplier service is deployed, reducing the chance of failure of the client services and increasing uptime of servers providing those services. The technical consideration of the teachings provided herein provides an efficient solution to transcend the inefficiencies of the prior art.

When these effects are considered in aggregate, one or more of the methodologies described herein may obviate a need for certain efforts or resources that otherwise would be involved in deploying software using CICD pipelines. Efforts expended by an administrator in deploying software using CICD pipelines may also be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Certain embodiments are described herein as including logic or a number of components, modules, or mechanisms. Modules may constitute either software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
causing a user interface to be presented on a first device associated with a first account, the first account having permissions to modify a first software project and lacking permissions to modify a second software project, wherein the first software project depends on a service associated with the second software project;
receiving, via the user interface, a request from the first account to lock a deployment pipeline of the second software project;
responsive to receiving the request from the first account to lock the deployment pipeline of the second software project, accessing a permissions table to determine that the first account has permission to lock deployment of the second software project even though the first account does not have permission to modify the second software project and creating, by one or more processors, a lock on the deployment pipeline of the second software project by creating a record in a dependency lock table; and
in response to successful execution of the first software project, removing the lock on the deployment pipeline of the second software project.

2. The method of claim 1, further comprising:
causing a second user interface to be presented on a second device associated with a second account, the second account having permissions to modify the second software project; and
receiving, via the second user interface, an authorization for accounts associated with the first software project to lock the deployment pipeline of the second software project, wherein the creating of the lock on the deployment pipeline of the second software project is based on the authorization.

3. The method of claim 1, further comprising:
causing a second user interface to be presented on a second device associated with a second account, the second account having permissions to modify the second software project;
receiving, via the second user interface, a second request from the second account to proceed to a next step of the deployment pipeline of the second software project;
in response to the second request and based on the lock on the deployment pipeline being associated with the first software project, executing at least a portion of the first software project to generate a result which indicates if the deployment pipeline is allowed to proceed; and
based on the result, denying the second request to proceed to the next step of the deployment pipeline of the second software project.

4. The method of claim 3, further comprising:
causing a third user interface to be presented on a third device associated with a third account, the third account having permissions to modify a third software project and lacking permissions to modify the second software project;
receiving, via the third user interface, a third request from the third account to lock the deployment pipeline of the second software project;

in response to the receipt of the third request, creating a second lock on the deployment pipeline of the second software project, the second lock being associated with the third software project; and in response to the second request and based on the second lock on the deployment pipeline being associated with the third software project, executing at least a portion of the third software project to generate a second result;

wherein the denying of the second request to proceed to the next step of the deployment pipeline is further based on the second result which indicates that the deployment pipeline is not allowed to proceed.

5. The method of claim 3, further comprising:

selecting, via the second user interface, a supplier software project from a first set of software projects, a client software project from a second set of software projects, and at least a portion of the client software project;

wherein the request from the first account to lock the deployment pipeline of the second software project is based on:

selection of the second software project as the supplier software project;

selection of the first software project as the client software project; and the executing of the at least a portion of the first software project is based on selection of at least a portion of the first software project.

6. A system comprising:

a memory that stores instructions; and one or more processors configured by the instructions to perform operations comprising:

causing a user interface to be presented on a first device associated with a first account, the first account having permissions to modify a first software project and lacking permissions to modify a second software project, wherein the first software project depends on a service associated with the second software project;

receiving, via the user interface, a request from the first account to lock a deployment pipeline of the second software project;

responsive to receiving the request from the first account to lock the deployment pipeline of the second software project, accessing a permissions table to determine that the first account has permission to lock deployment of the second software project even though the first account lacks permission to modify the second software project and creating, by one or more processors, a lock on the deployment pipeline of the second software project by creating a record in a dependency lock table; and in response to successful execution of the first software project, removing the lock on the deployment pipeline of the second software project.

7. The system of claim 6, wherein the operations further comprise:

causing a second user interface to be presented on a second device associated with a second account, the second account having permissions to modify the second software project; and receiving, via the second user interface, an authorization for accounts associated with the first software project to lock the deployment pipeline of the second software project, wherein the creating of the lock on the deployment pipeline of the second software project is based on the authorization.

8. The system of claim 6, wherein the operations further comprise:

causing a second user interface to be presented on a second device associated with a second account, the second account having permissions to modify the second software project;

receiving, via the second user interface, a second request from the second account to proceed to a next step of the deployment pipeline of the second software project;

in response to the second request and based on the lock on the deployment pipeline being associated with the first software project, executing at least a portion of the first software project to generate a result which indicates if the deployment pipeline should be allowed to proceed; and based on the result, denying the second request to proceed to the next step of the deployment pipeline of the second software project.

9. The system of claim 8, wherein the operations further comprise:

causing a third user interface to be presented on a third device associated with a third account, the third account having permissions to modify a third software project and lacking permissions to modify the second software project;

receiving, via the third user interface, a third request from the third account to lock the deployment pipeline of the second software project;

in response to the receipt of the third request, creating a second lock on the deployment pipeline of the second software project, the second lock being associated with the third software project; and in response to the second request and based on the second lock on the deployment pipeline being associated with the third software project, executing at least a portion of the third software project to generate a second result which indicates that the deployment pipeline should be allowed to proceed;

wherein the denying of the second request to proceed to the next step of the deployment pipeline is further based on the second result.

10. The system of claim 8, wherein the operations further comprise:

selecting, via the second user interface a supplier software project from a first set of software projects, a client software project from a second set of software projects, and at least a portion of the client software project;

wherein the request from the first account to lock the deployment pipeline of the second software project is based on:

selection of the second software project as the supplier software project; and selection of the first software project as the client software project; and the executing of the at least a portion of the first software project is based on selection of at least a portion of the first software project.

11. A non-transitory machine-readable medium that stores instructions that, when executed by one or more processors, cause the one or processors to perform operations comprising:

causing a user interface to be presented on a first device associated with a first account, the first account having permissions to modify a first software project and lacking permissions to modify a second software project, wherein the first software project depends on a service associated with the second software project;

receiving, via the user interface, a request from the first account to lock a deployment pipeline of the second software project;
responsive to receiving the request from the first account to lock the deployment pipeline of the second software project, accessing a permissions table to determine that the first account has permission to lock deployment of the second software project even though the first account does not have permission to modify the second software project and creating, by one or more processors, a lock on the deployment pipeline of the second software project by creating a record in a dependency lock table; and
in response to successful execution of the first software project, removing the lock on the deployment pipeline of the second software project.

12. The machine-readable medium of claim 11, wherein the operations further comprise:
causing a second user interface to be presented on a second device associated with a second account, the second account having permissions to modify the second software project; and
receiving, via the second user interface, an authorization for accounts associated with the first software project to lock the deployment pipeline of the second software project, wherein the creating of the lock on the deployment pipeline of the second software project is based on the authorization.

13. The machine-readable medium of claim 11, wherein the operations further comprise:
causing a second user interface to be presented on a second device associated with a second account, the second account having permissions to modify the second software project;
receiving, via the second user interface, a second request from the second account to proceed to a next step of the deployment pipeline of the second software project;
in response to the second request and based on the lock on the deployment pipeline being associated with the first software project, executing at least a portion of the first software project to generate a result which indicates if the deployment pipeline is allowed to proceed; and
based on the result, denying the second request to proceed to the next step of the deployment pipeline of the second software project.

14. The machine-readable medium of claim 13, wherein the operations further comprise:
causing a third user interface to be presented on a third device associated with a third account, the third account having permissions to modify a third software project and lacking permissions to modify the second software project;
receiving, via the third user interface, a third request from the third account to lock the deployment pipeline of the second software project;
in response to the receipt of the third request, creating a second lock on the deployment pipeline of the second software project, the second lock being associated with the third software project; and
in response to the second request and based on the second lock on the deployment pipeline being associated with the third software project, executing at least a portion of the third software project to generate a second result which indicates that the deployment pipeline is allowed to proceed;
wherein the denying of the second request to proceed to the next step of the deployment pipeline is further based on the second result.

15. The machine-readable medium of claim 13, wherein the operations further comprise:
selecting, via the second user interface a supplier software project from a first set of software projects, a client software project from a second set of software projects, and at least a portion of the client software project;
wherein the request from the first account to lock the deployment pipeline of the second software project is based on:
selection of the second software project as the supplier software project; and
selection of the first software project as the client software project; and
the executing of the at least a portion of the first software project is based on selection of at least a portion of the first software project.

16. The method of claim 1, wherein the dependency lock table comprises a supplier service field which identifies the second software project, a client service field that identifies the first software project, and a supplier stage field that identifies the stage of the deployment pipeline of the second software project before which the deployment lock is being placed.

17. The method of claim 1, wherein the first software project and the second software project are both software projects for services in a microservices-architecture application, and wherein the lock is a service dependency lock on the service associated with the second software project.

18. The system of claim 6, wherein the first software project and the second software project are both software projects for services in a microservices-architecture application, and wherein the lock is a service dependency lock on the service associated with the second software project.

19. The method of claim 1, wherein the first software project and the second software project are both software projects for services of different microservices-architecture applications, and wherein the lock is an external lock on the service associated with the second software project by the first account.

20. The system of claim 6, wherein the first software project and the second software project are both software projects for services of different microservices-architecture applications, and wherein the lock is an external lock on the service associated with the second software project by the first account.

* * * * *